United States Patent
Unveren et al.

(10) Patent No.: US 10,707,538 B2
(45) Date of Patent: Jul. 7, 2020

(54) SAFETY SENSOR MODULE WITH VEHICLE COMMUNICATION TO FIRST RESPONDERS

(71) Applicant: Dura Operating, LLC, Auburn Hills, MI (US)

(72) Inventors: Cumhur Unveren, Commerce Township, MI (US); Lionel Bitauld, Gif sur Yvette (FR); Joseph Bosnjak, Jouars Pontchartrain (FR)

(73) Assignee: DURA OPERATING, LLC, Auburn Hills, MI (US)

( * ) Notice: Subject to any disclaimer, the term of this patent is extended or adjusted under 35 U.S.C. 154(b) by 198 days.

(21) Appl. No.: 15/663,294

(22) Filed: Jul. 28, 2017

(65) Prior Publication Data

US 2018/0366787 A1    Dec. 20, 2018

Related U.S. Application Data

(63) Continuation-in-part of application No. 15/661,536, filed on Jul. 27, 2017, which is a continuation-in-part of application No. 15/626,692, filed on Jun. 9, 2017.

(51) Int. Cl.
*H01M 10/42* (2006.01)
*H01M 10/48* (2006.01)
(Continued)

(52) U.S. Cl.
CPC ....... *H01M 10/4228* (2013.01); *B60L 3/0007* (2013.01); *B60L 3/0046* (2013.01);
(Continued)

(58) Field of Classification Search
CPC ........... H01M 10/4207; H01M 10/425; H01M 10/482; H01M 10/4228; H01M 2/1077
See application file for complete search history.

(56) References Cited

U.S. PATENT DOCUMENTS

| | | | |
|---|---|---|---|
| 4,798,968 A | 1/1989 | Deem | |
| 5,034,620 A | 7/1991 | Cameron | |

(Continued)

FOREIGN PATENT DOCUMENTS

| | | |
|---|---|---|
| CN | 102064364 A | 5/2011 |
| JP | 1999219732 A | 3/2002 |

(Continued)

*Primary Examiner* — Osei K Amponsah
(74) *Attorney, Agent, or Firm* — Vivacqua Crane PLLC (57) ABSTRACT

A battery system for a vehicle includes a battery pack having a structure receiving at least one battery. Multiple sensors are mounted to the structure and sense operating conditions inside and outside of the structure. A safety module is disposed on the structure, the safety module having a centralized sensor processor processing signals received from the multiple sensors to identify if any of the operating conditions defines an abnormal condition of the structure. At least one battery pack sensor senses a condition within the battery pack and is in communication with a vehicle battery management system (BMS). The safety module is in communication with the BMS such that the condition within the battery pack is also communicated to the safety module. The centralized sensor processor identifies if the condition within the battery pack correlates with the abnormal condition of the structure.

18 Claims, 8 Drawing Sheets

(51) Int. Cl.
*H01M 2/10* (2006.01)
*B60L 50/64* (2019.01)
*B60L 3/00* (2019.01)
*B60L 58/10* (2019.01)
*B60Q 5/00* (2006.01)

(52) U.S. Cl.
CPC .............. *B60L 50/64* (2019.02); *B60L 58/10* (2019.02); *H01M 2/1077* (2013.01); *H01M 10/425* (2013.01); *H01M 10/4207* (2013.01); *H01M 10/482* (2013.01); *B60Q 5/005* (2013.01); *H01M 2010/4271* (2013.01); *H01M 2010/4278* (2013.01); *H01M 2200/00* (2013.01); *H01M 2220/20* (2013.01)

(56) References Cited

U.S. PATENT DOCUMENTS

| | | | |
|---|---|---|---|
| 6,599,656 | B2 | 7/2003 | Cittanova |
| 7,339,774 | B2 | 3/2008 | Zdziech et al. |
| 7,511,456 | B2 | 3/2009 | Lee et al. |
| 7,521,817 | B2 | 4/2009 | Gors |
| 8,307,934 | B2 | 11/2012 | Rini et al. |
| 8,846,232 | B2 | 9/2014 | Tse |
| 8,884,459 | B2 | 11/2014 | Smith et al. |
| 9,208,670 | B2 | 12/2015 | Krieg et al. |
| 9,248,746 | B2 | 2/2016 | Wen |
| 2011/0111269 | A1 | 5/2011 | Tse |
| 2012/0150393 | A1* | 6/2012 | Knight-Newbury ...... B60L 3/04 701/45 |
| 2016/0141572 | A1* | 5/2016 | Nakayama .......... H01M 2/1258 429/53 |
| 2016/0292937 | A1 | 10/2016 | Taylor et al. |
| 2017/0008402 | A1 | 1/2017 | Thomas et al. |

FOREIGN PATENT DOCUMENTS

| | | |
|---|---|---|
| JP | 2002289262 A | 10/2002 |
| JP | 2007200880 A | 8/2007 |
| JP | 2008535174 A | 8/2008 |
| JP | 2010153117 A | 7/2010 |
| WO | 2009011749 A1 | 1/2009 |

* cited by examiner

SAFETY SENSOR MODULE WITH VEHICLE COMMUNICATION TO FIRST RESPONDERS

CROSS-REFERENCE TO RELATED APPLICATIONS

This application is a continuation-in-part of prior U.S. application Ser. No. 15/661,536 filed on Jul. 27, 2017, which is a continuation-in-part of prior U.S. application Ser. No. 15/626,692 filed on Jun. 19, 2017. The entire disclosures of the above applications are hereby incorporated by reference.

FIELD

The present disclosure relates generally to vehicle system condition sensing and vehicle system condition transmission systems, including emergency responder signaling.

BACKGROUND

The statements in this section merely provide background information related to the present disclosure and may or may not constitute prior art.

Automobile vehicles including electric vehicles and hybrid vehicles providing at least partial propulsion from battery power create unique conditions that must be considered due to the energy and fluid in the battery packs provided with the vehicle when the vehicle is disabled or in an accident. A first responder such as a fire truck or tow vehicle which approaches a battery and hybrid powered vehicle needs to take action to discharge the battery pack to reduce possible spark and fire conditions. Known battery and hybrid powered vehicle battery packs are accessible via a power charging connection, however this connection may not be available to a first responder after a collision or other accident.

The battery packs of known battery powered and hybrid or battery-engine powered vehicles, hereinafter collectively referred to as "battery powered" vehicles, also do not provide a common communication system to collect all battery pack sensor output which is then made available to the vehicle operator and outside of the vehicle such as to first responders.

Thus, while current vehicle battery pack systems achieve their intended purpose, there is a need for a new and improved system and method for collecting.

SUMMARY

According to several aspects, a battery system for a vehicle includes a battery pack having a structure receiving at least one battery. At least one first sensor is mounted to the structure sensing an operating condition inside or outside of the structure. A safety module is disposed on the structure. The safety module processes signals received from the at least one first sensor to identify if the operating condition defines an abnormal condition. At least one second sensor senses a condition of the battery pack and is in communication with a vehicle battery management system (BMS). The safety module in communication with the BMS such that the condition of the battery pack is also communicated to the safety module.

In another aspect of the present disclosure, the safety module includes a memory at least temporarily saving signal data from the at least one first sensor as a code.

In another aspect of the present disclosure, the BMS is in communication with a body control management (BCM) module which isolates the battery pack following indication of the abnormal condition.

In another aspect of the present disclosure, the safety module includes a centralized sensor processor receiving signals from the at least one first sensor and in communication with the BMS, the BCM, and the memory.

In another aspect of the present disclosure, the at least one first sensor defines a gas sensor.

In another aspect of the present disclosure, the gas sensor defines a battery leak methane gas sensor.

In another aspect of the present disclosure, the structure includes a surface with the gas sensor positioned on the surface.

In another aspect of the present disclosure, the structure includes a low point, and the at least one first sensor defines a moisture sensor positioned at the low point.

In another aspect of the present disclosure, the structure includes a surface with the at least one first sensor adhesively connected to the surface.

In another aspect of the present disclosure, the structure includes a surface with the at least one first sensor attached to the surface using a prong frictionally received in an aperture created in the surface.

In another aspect of the present disclosure, the at least one battery includes multiple battery cells; and the structure includes multiple cross beams successively defining a plurality of sub-chambers each receiving an individual battery cell of the at multiple battery cells.

In another aspect of the present disclosure, the at least one first sensor defines multiple moisture sensors having one of the multiple moisture sensors mounted in each of the sub-chambers.

According to several aspects, a battery system for a vehicle includes a battery pack having a structure receiving at least one battery. Multiple sensors are mounted to the structure and sense operating conditions inside and outside of the structure. A safety module is disposed on the structure. The safety module has a centralized sensor processor processing signals received from the multiple sensors to identify if any of the operating conditions defines an abnormal condition of the structure. At least one battery pack sensor senses a condition within the battery pack and is in communication with a vehicle battery management system (BMS). The safety module is in communication with the BMS such that the condition within the battery pack is also communicated to the safety module. The centralized sensor processor further identifies if the condition within the battery pack correlates with the abnormal condition of the structure.

In another aspect of the present disclosure, the structure includes a frame defining a chamber containing the at least one battery; and at least one of the multiple sensors defines a moisture sensor mounted at a low point of the structure.

In another aspect of the present disclosure, the structure includes a frame defining a chamber containing the at least one battery; and at least one of the multiple sensors defines a battery leak methane gas sensor mounted to a surface of the frame.

In another aspect of the present disclosure, the structure defines a frame having an outer wall defining a chamber containing the at least one battery; and at least one of the multiple sensors defines an impact sensor mounted to the outer wall.

In another aspect of the present disclosure, the structure defines a frame having an outer wall defining a chamber containing the at least one battery; and the safety module is mounted to the outer wall external to the chamber.

In another aspect of the present disclosure, the BMS is in communication with a body control management (BCM) module which isolates the battery pack following indication of the abnormal condition.

In another aspect of the present disclosure, the safety module includes a memory at least temporarily saving signal data from each of the multiple sensors as sensor codes.

In another aspect of the present disclosure, the centralized sensor processor is in direct communication with the BMS, the BCM, and the memory.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
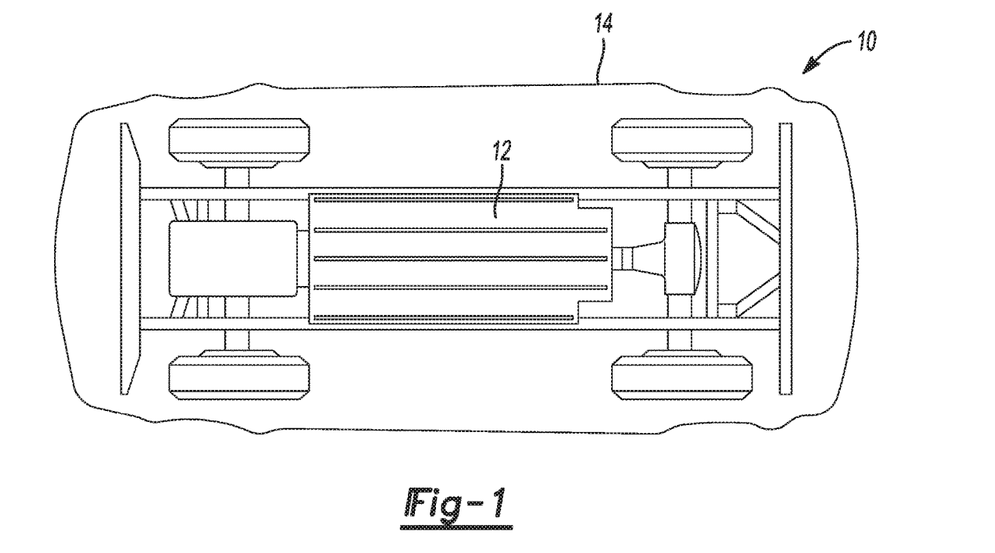
FIG. 1 is rear left perspective view of an automobile vehicle having a battery pack safety system for a battery powered vehicle according to an exemplary embodiment.

Referring to FIG. 1, a vehicle battery safety sensor system 10 is incorporated with a battery unit or battery pack 12 mounted to a vehicle 14. The battery pack 12 provides an electrical charge as the sole power to propel the vehicle 14, or may provide supplemental power in addition to an engine (not shown).

Referring to FIG. 2 and again to FIG. 1, the vehicle battery safety sensor system 10 together with the battery pack 12 are supported using a structural unit or frame 16 made for example from one or more materials such as a metal including aluminum, or a combination of materials such as a metal and a polymeric material or a composite material. The frame 16 may provide one or more mounting flanges 18 to connect the frame 16 to structure of the vehicle 14. The vehicle battery safety sensor system 10 further includes a stranded energy discharge module 20 permitting battery cell discharge in the event of an accident, and a battery emergency response module 22 which can provide signals locally or remotely for a vehicle and a battery emergency condition. The vehicle battery safety sensor system 10 further includes a safety module 24 which will be described in greater detail below.

Figure 2:
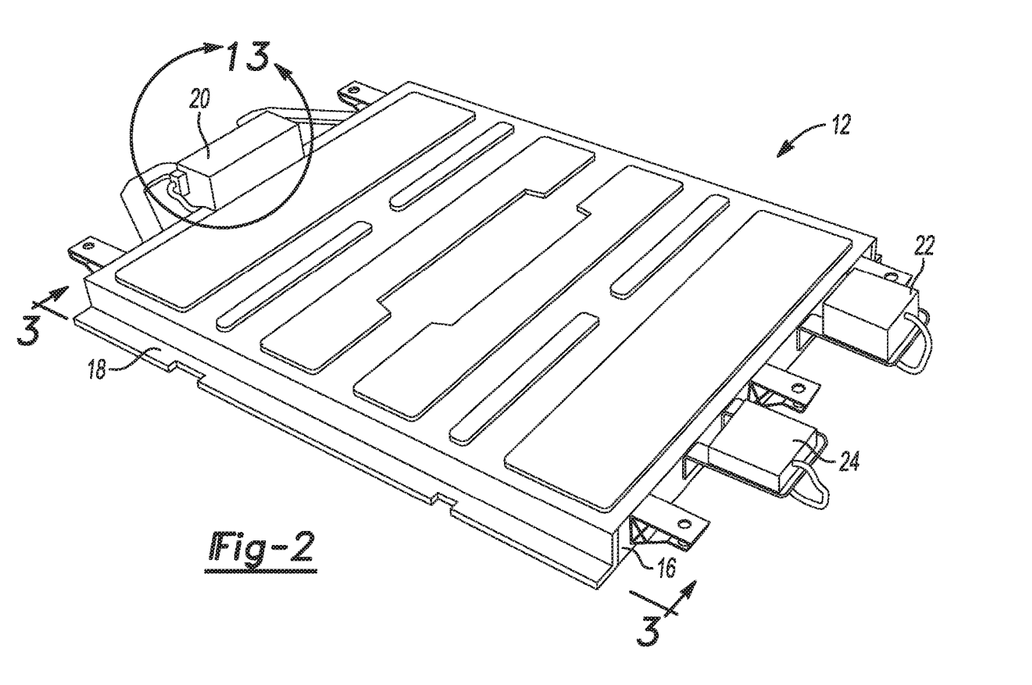
FIG. 2 is a top left perspective view of a battery pack of the present disclosure.

Referring to FIG. 3 and again to FIG. 2, the battery pack 12 includes at least one and according to several aspects multiple battery cells 26. Each successive pair of the battery cells 26 may be separated by a dividing barrier or cross beam 28. In further aspects, the battery cells 26 are not separated by cross beams, but are positioned in an open cell space, bay or chamber. According to several aspects, a battery leak methane gas sensor 29 can be provided within the battery pack 12 at a location conducive to sensing methane gas from any of the individual battery cells 26.

Figure 3:
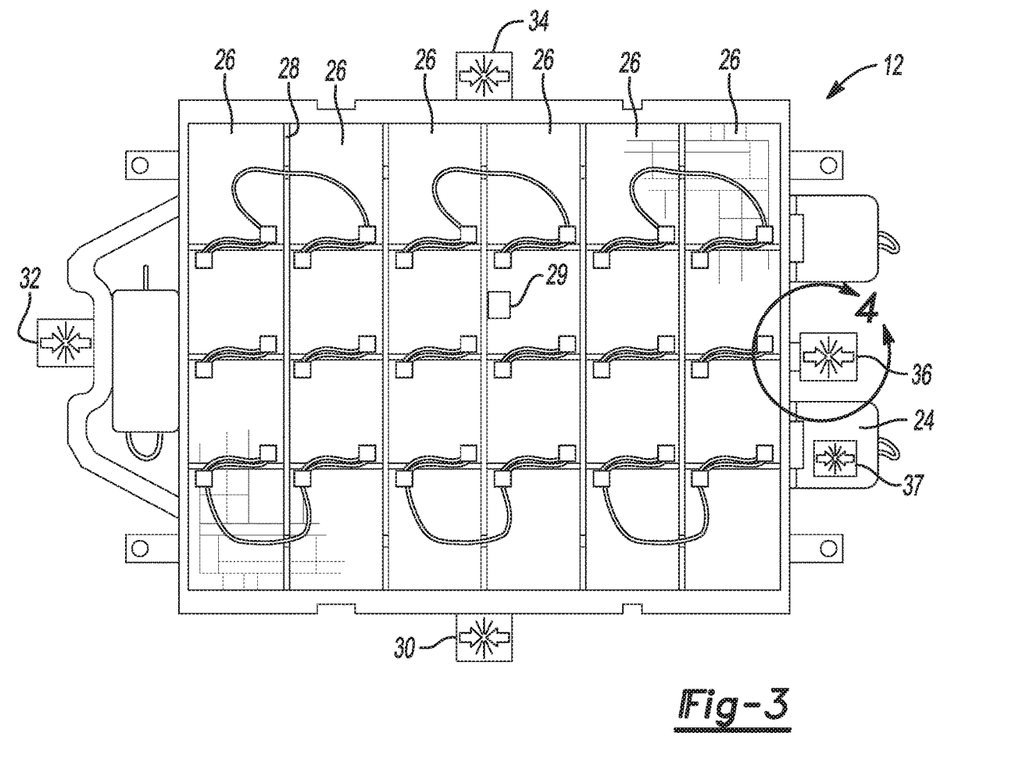
FIG. 3 is a cross sectional top plan view taken at section 3 of FIG. 2.

According to several aspects, the vehicle battery safety sensor system 10 provides at least one and according to several aspects multiple sensors connected to the frame 16 supporting the battery pack 12, including at least one impact sensor connected to one of the walls of the frame 16, or may include multiple impact sensors each connected to one or more of the walls of the frame 16, such as a first impact sensor 30, a second impact sensor 32, a third impact sensor 34 and a fourth impact sensor 36. According to several aspects, one impact sensor such as the first impact sensor 30 is mounted to one of the side walls. According to further aspects, one of the first, second, third, and fourth impact sensors 30, 32, 34, 36 is individually mounted to each one of the side walls of the battery pack 12, to provide sensed impact values for each side of the battery pack 12. An output from the impact sensor or sensors, such as from each of the first, second, third, and fourth impact sensors 30, 32, 34, 36 is communicated to the safety module 24. Each of the impact sensors may be provided in the form of an accelerometer or a strain gage.

According to several aspects, in lieu of the first, second, third, and fourth impact sensors 30, 32, 34, 36 being mounted to each of the side walls, a single impact sensor 37 is located in the safety module 24. The impact sensor 37 may be a micro-electro-mechanical-system (MEMS) digital output motion sensor such as but not limited to an ultra-low power, high performance 3-axis FEMTO Accelerometer.

According to several aspects, the one or more impact sensors provide an output signal in response to a predefined structural loading applied to the frame 16. For example, when multiple impact sensors are provided, an output signal from any single one of the impact sensors may indicate a localized impact and damage to the area of the frame 16 where that impact sensor is mounted. An output from the impact sensors can be cumulatively collected as well. For example, a first predefined cumulative level of strain or impact energy may trigger an impact sensor output signal indicating damage less than total may require repair to the frame 16. Similarly, a second predefined cumulative level of strain may trigger an impact sensor output signal indicating a failure of the frame 16 has occurred. An output signal from the impact sensor 37 located in the safety module 24 may provide a collective loading of the frame 16, or in general a collective displacement of the battery pack 12.

Figure 4:
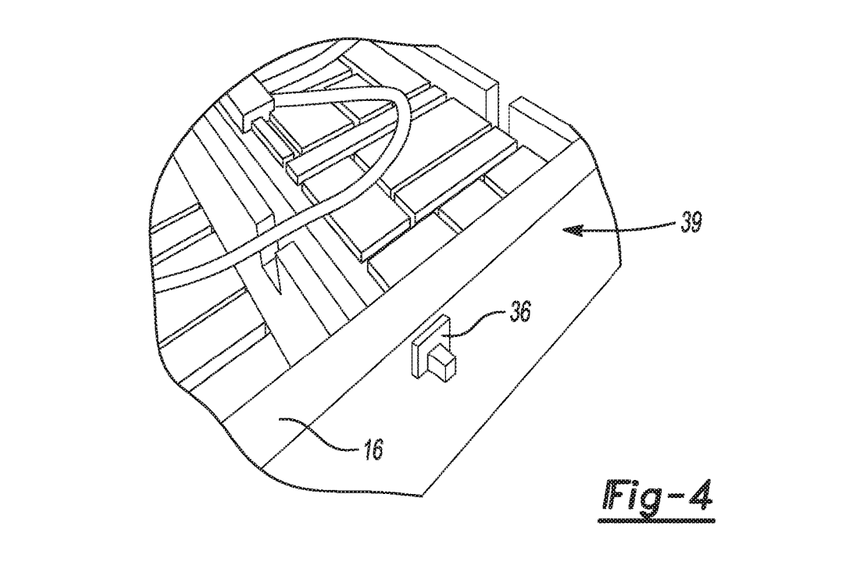
FIG. 4 is a top perspective view of area 4 of FIG. 3.

Referring to FIG. 4 and again to FIG. 3, each of the impact sensors such as the exemplary fourth impact sensor 36 may be mounted to an outer facing wall 39 of the frame 16. The impact sensors can also be positioned differently than shown and therefore about any desired position of the frame 16.

Referring to FIG. 5 and again to FIG. 2, the frame 16 of the battery pack 12 may include a single large battery cell bay or chamber, or may include multiple battery cell bays or chambers such as an exemplary battery cell bay 38 which may be bounded between successive cross beams 28, such as between cross beams 28(1), 28(2). In order to collect any fluid leakage that may occur from the battery cells, and also to collect any moisture such a water that may enter the battery pack 12, each of the battery cell bays 38 can include a low point 40. Moisture or battery fluid entering the battery cell bays 38 collects at each low point 40 and is sensed by a moisture sensor 42 such as a water or battery fluid sensor positioned at the low point 40. When fluid is present and triggers an output signal, the output signal from each of the multiple moisture sensors 42 is communicated to the safety module 24. If desired, a particular battery cell bay 38 wherein one of the moisture sensors 42 triggers may be identified by the vehicle battery safety sensor system 10 of the present disclosure. Flow direction arrows 44 indicate a general flow direction of fluid toward the moisture sensors 42 from one side of the frame 16, and oppositely directed flow arrows 45 indicate a general flow direction of fluid toward the moisture sensors 42 from an opposite side of the frame 16. Although the moisture sensors 42 are depicted positioned substantially in a central location of each of the battery cell bays 38, the low points 40, and therefore the position of the moisture sensors 42 can be moved toward either side of the frame 16 from those shown.

Figure 5:
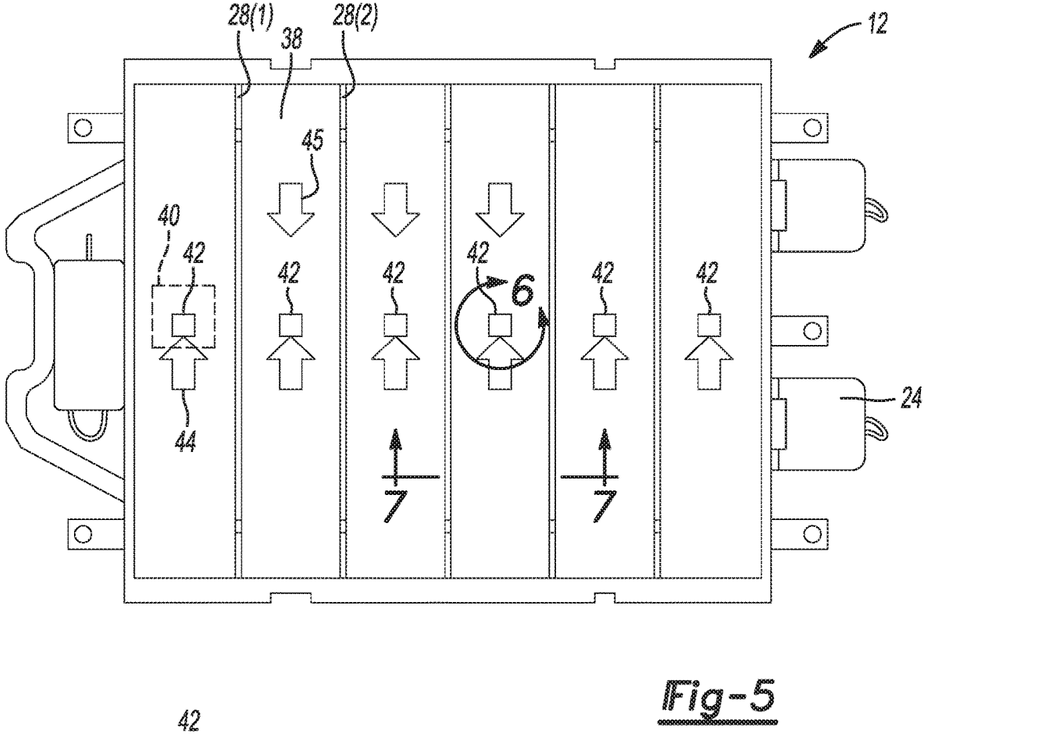
FIG. 5 is a cross sectional top plan view similar to FIG. 3.

Referring to FIG. 6 and again to FIG. 5, each of the moisture sensors 42 can be a singular sensor, or according to several aspects can be provided as a double sensor 46 as shown. The use of double sensors 46 provides redundancy and an increased accuracy in the sensed moisture level.

Figures 6, 7:
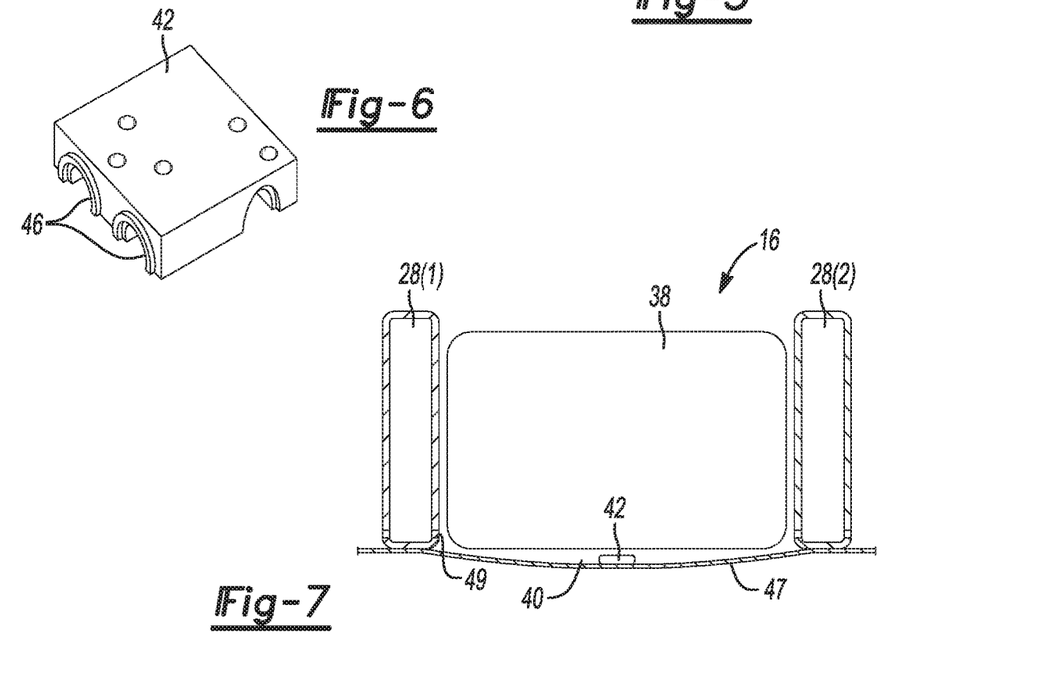
FIG. 6 is a top left perspective view of area 6 of FIG. 5.
FIG. 7 is a cross sectional front elevational view taken at section 7 of FIG. 6.

Referring to FIG. 7 and again to FIGS. 5 and 6, a bottom wall 47 of the frame 16 can be curved or pitched downwardly from each of successive ones of the cross beams 28, such as between cross beams 28(1), 28(2) toward the centrally located low point 40. The low point 40 can also be positioned to the left or to the right of the low point 40 as shown in FIG. 7 as desired, as well as toward or away from the viewer. According to several aspects a single low point 40 can also be provided for the entire frame 16, with weep holes 49 allowing fluid flow through each of the cross beams 28 to allow all fluid to collect in the single low point 40, and with a common pitch of the battery pack 12 such as at a one degree downward angle that aids in the flow of liquid to the low point 40.

Figure 8:
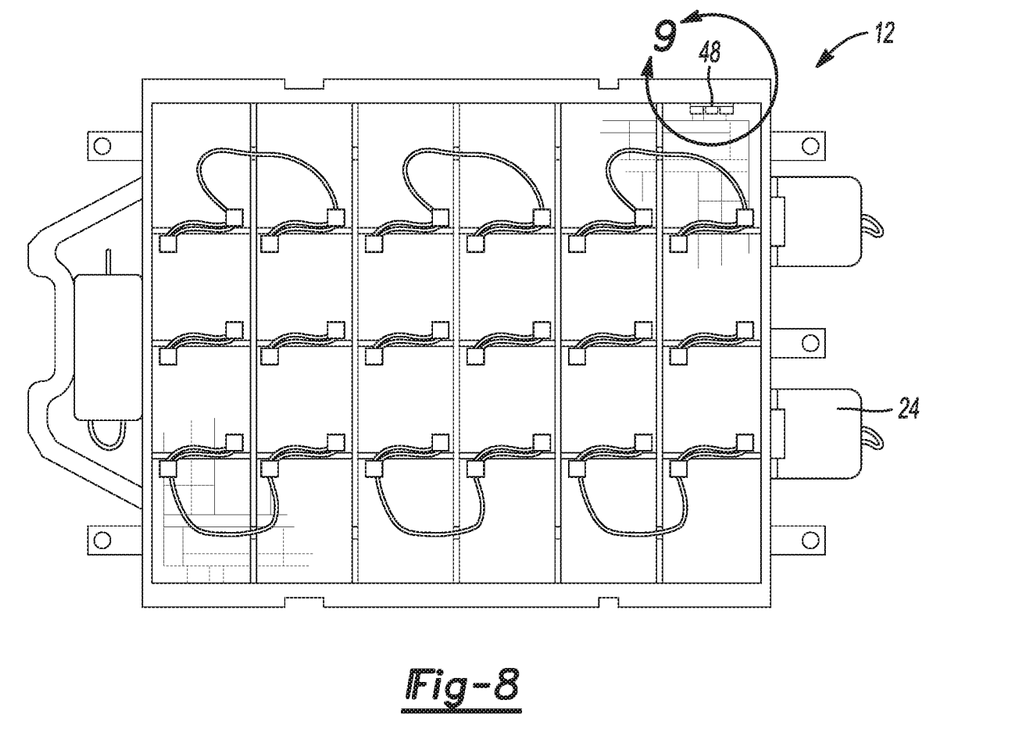
FIG. 8 is a cross sectional top plan view similar to FIG. 3.
Figure 9:
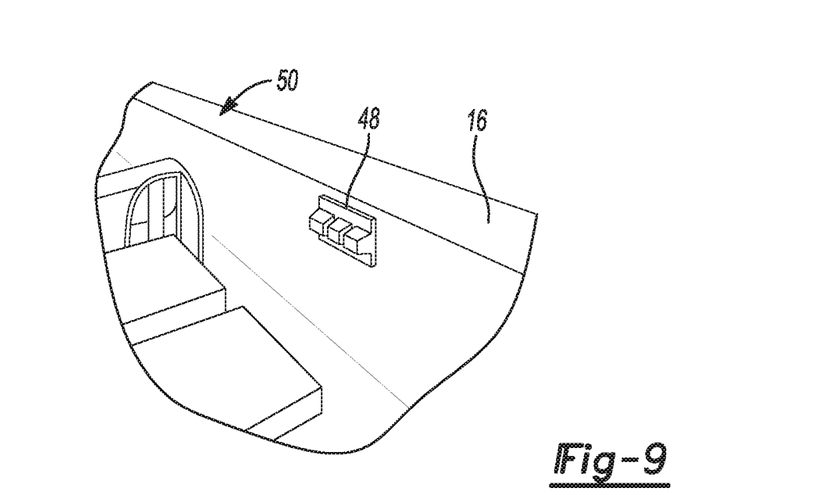
FIG. 9 is a top left perspective view of area 9 of FIG. 8.

Referring to FIGS. 8 and 9, and again to FIGS. 2 and 3, the vehicle battery safety sensor system 10 can further include one or more smoke sensors 48. The smoke sensors 48 can detect heat or smoke, and can be mounted to an inside wall 50 of the frame 16, for example at opposing inside corners of the frame 16. The output signal from each of the multiple smoke sensors 48 is communicated to the safety module 24.

Figure 10:
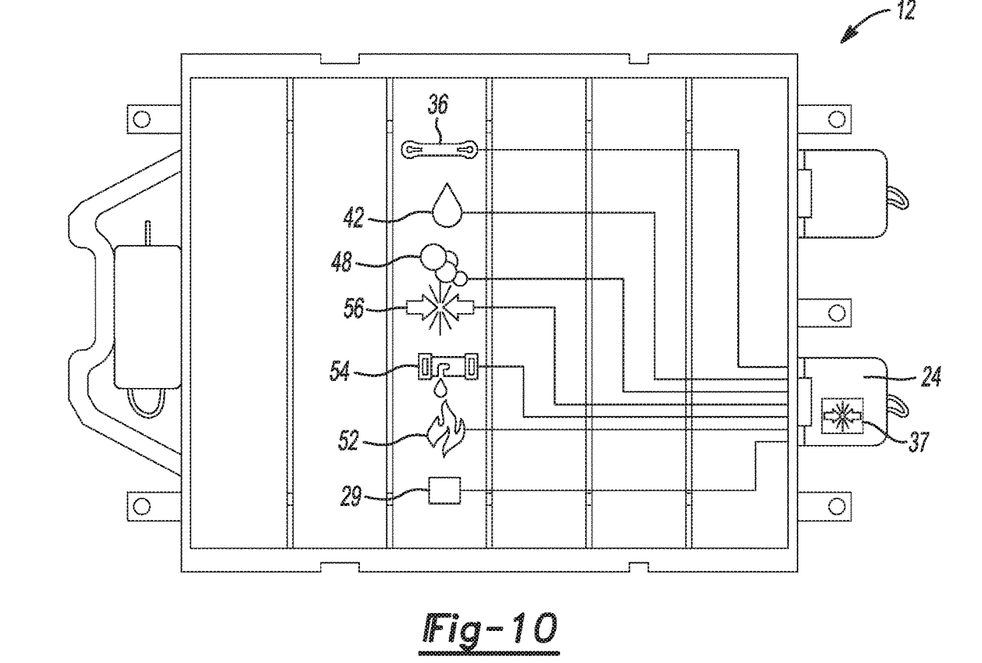
FIG. 10 is a cross sectional top plan view similar to FIG. 3.

Referring to FIG. 10 and again to FIGS. 2 through 9, in addition to the above noted battery leak methane gas sensor 29, the one or more of the first, second, third, and fourth impact sensors 30, 32, 34, 36, the impact sensor 37, the moisture sensors 42, and the smoke sensors 48, the vehicle battery safety sensor system 10 can further include one or more of each of a combination fire and smoke sensor 52, at least one battery fluid leak sensor 54 and at least one accelerometer 56. The output signals from all of the sensors of the battery pack 12 are communicated to the safety module 24, with the impact sensor 37 already present in the safety module.

Referring to FIG. 11 and again to FIGS. 1 through 10, an exemplary diagram of the vehicle battery safety sensor system 10 of the present disclosure includes the safety module 24 in communication with all of the sensors. The safety module 24 may provide computational capability and therefore may include features such as a memory including an EEPROM 58. The safety module 24 receives the output signals from each of the multiple sensors such as the battery leak methane gas sensor 29, the first, second, third, and fourth impact sensors 30, 32, 34, 36, the impact sensor 37 located within the safety module 24, the moisture sensors 42, the battery fluid leak sensors 54, and the accelerometers 56 and coordinates an output signal indicating a condition of the battery pack 12 and the frame 16. The safety module 24 is in communication with a vehicle main computer such as an electronic control unit (ECU) 60 via a high speed (control area network) CAN interface 62. A connector 64 is provided with the safety system 10 providing power and communication terminals, including a high speed CAN 66 and a low speed CAN 68 for communication with the ECU 60. A safety module power supply 70 is also connected via the connector 64 to a positive power terminal 72 and a ground terminal 74, thereby providing backup power for operation of the safety module 24 if power from the battery pack 12 is unavailable.

Figure 11:
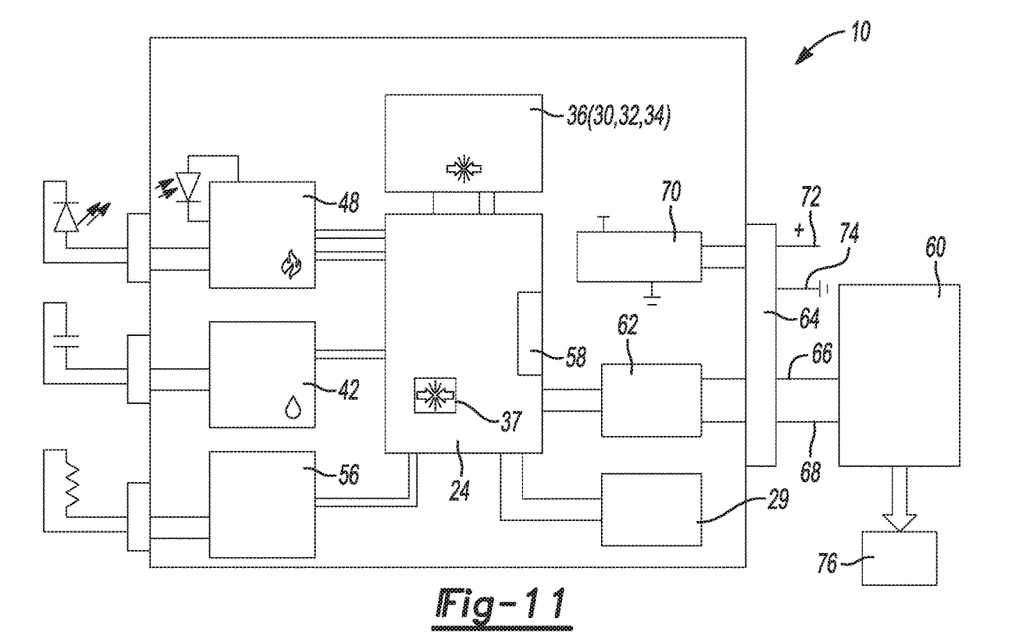
FIG. 11 is a diagrammatic presentation of the battery pack safety system for a battery powered vehicle according to an exemplary embodiment.

A warning module 76 is also in communication with the vehicle ECU 60, such that when a signal is forwarded by the safety module 24 to the vehicle ECU 60 the vehicle ECU 60 may energize any one or all of multiple different vehicle external warnings, including sounding of a vehicle horn or a separate sound emitting device in a pattern indicative of a condition of the battery pack 12 such as a rapid on-off sounding of the horn, flashing of either or both of the vehicle headlights or rear tail-lights in a pattern indicative of a condition of the battery pack 12 such as a predetermined on-off sequence, a remote signal sent via a wireless signal device, an internal message directed to the operator of the vehicle 14 such as a text message indicating the condition of the battery pack such as for example a smoke condition or structural damage to the frame 16, and the like can be initiated in the event of an output signal being transmitted from any one of the sensors of the vehicle battery safety sensor system 10. The warning module 76 is in communication with the safety module 24, such that the warning module 76 when initiated by a signal from the safety module 24 energizes a signaling device described in reference to FIG. 12 providing external vehicle indication of a status of the battery pack 12.

Referring to FIG. 12 and again to FIGS. 1 and 11, if the vehicle 14 is in an accident or damage occurs to the frame 16, the vehicle battery safety sensor system 10 using the safety module 24 forwards signals from the various sensors to the vehicle ECU 60, which determines based on a condition of the vehicle 14 whether to provide external visual indication of the vehicle condition to a first responder by energizing operation of a signaling device such as but not limited to vehicle lights 78 such as the headlights and taillights. A predetermined pattern of light operation such as for example by blinking three times can indicate smoke in the battery pack 12 or a battery fire, or by blinking four times can indicate a battery leak. The signaling device can also define an external audible indication of the vehicle condition which can be provided by operation of a sound emitting device or vehicle horn 80. A first responder can also provide a stranded energy discharge device 82 and an energy discharge cable 84 which may be used to discharge the stored energy charge of the battery pack 12. Signals from the safety module 24 can be transmitted even in the event that the power supply from the 12 volt DC battery pack 12 is cut by a first responder in an emergency.

Figure 12:
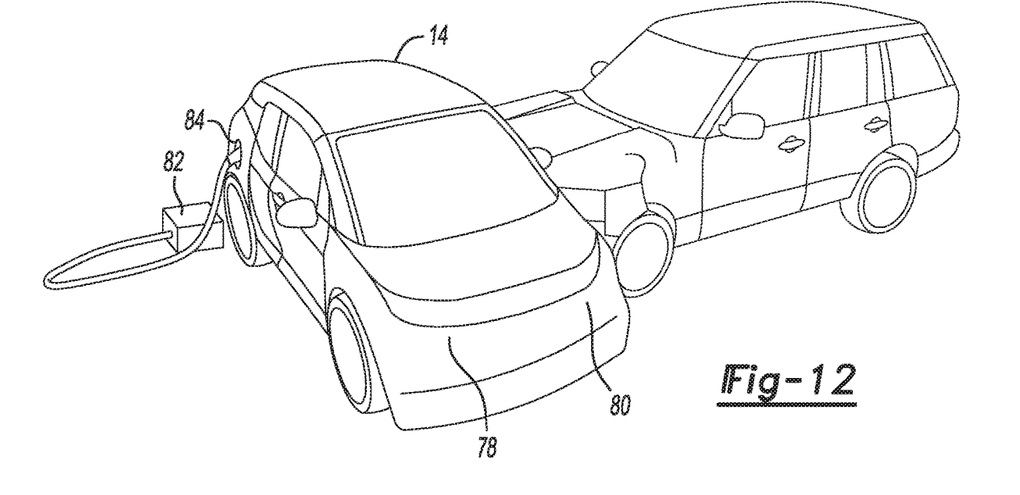
FIG. 12 is a front perspective view of the vehicle of FIG. 1.
Figure 13:
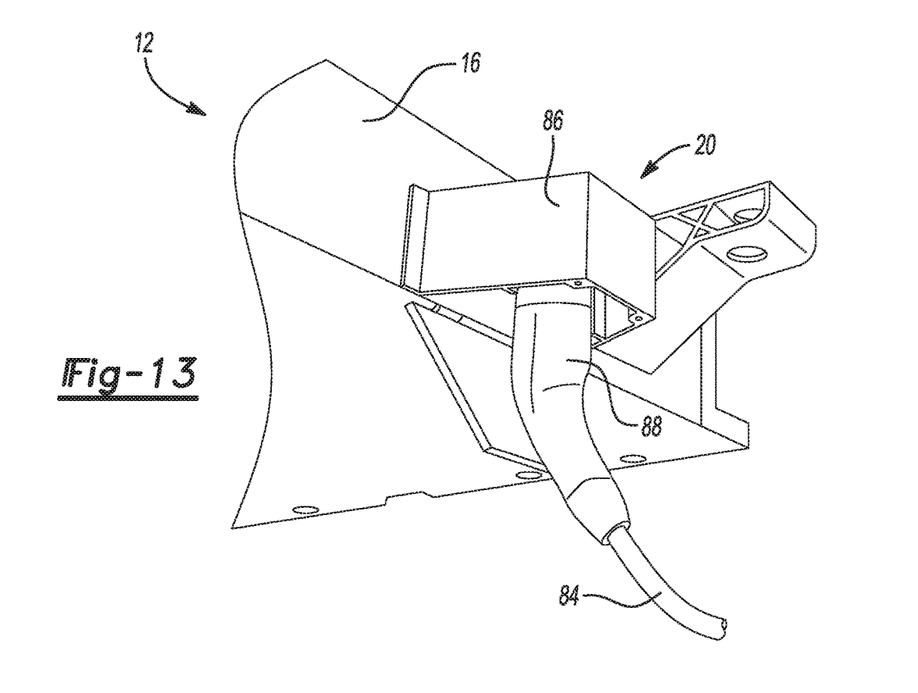
FIG. 13 is a bottom perspective view of area 13 of FIG. 2.

Referring to FIG. 13 and again to FIGS. 3 and 12, because it must be assumed the battery pack 12 holds a charge, the stranded energy discharge module 20 of the battery pack 12 includes a power discharge port 86 which can be connected to the multiple battery cells 26 of the battery pack 12 via a passage created through the frame 16. Energy from the multiple battery cells 26 of the battery pack 12 can be bled off to the energy discharge device 82 via the energy discharge cable 84 which is adapted to connect directly to the power discharge port 86.

Referring to FIG. 14 and again to FIGS. 1 through 13, a vehicle battery safety sensor system 88 is modified from the vehicle battery safety sensor system 10. The vehicle battery safety sensor system 88 includes a safety module 90 which provides multiple sensors connected to and sensing various conditions of the frame 16 of the battery pack 12. These sensors include at least one of each of the battery leak methane gas sensor 29, first, second, third, and fourth impact sensors 30, 32, 34, 36, an isolation leak sensor 92, smoke sensors 48 and heat sensors 94, moisture sensors 42, a liquid sensor 96, combination fire and smoke sensors 52, and battery fluid leak sensors 54 which are connected to or sense conditions of the frame 16 and communicate directly with the safety module 90.

Figure 14:
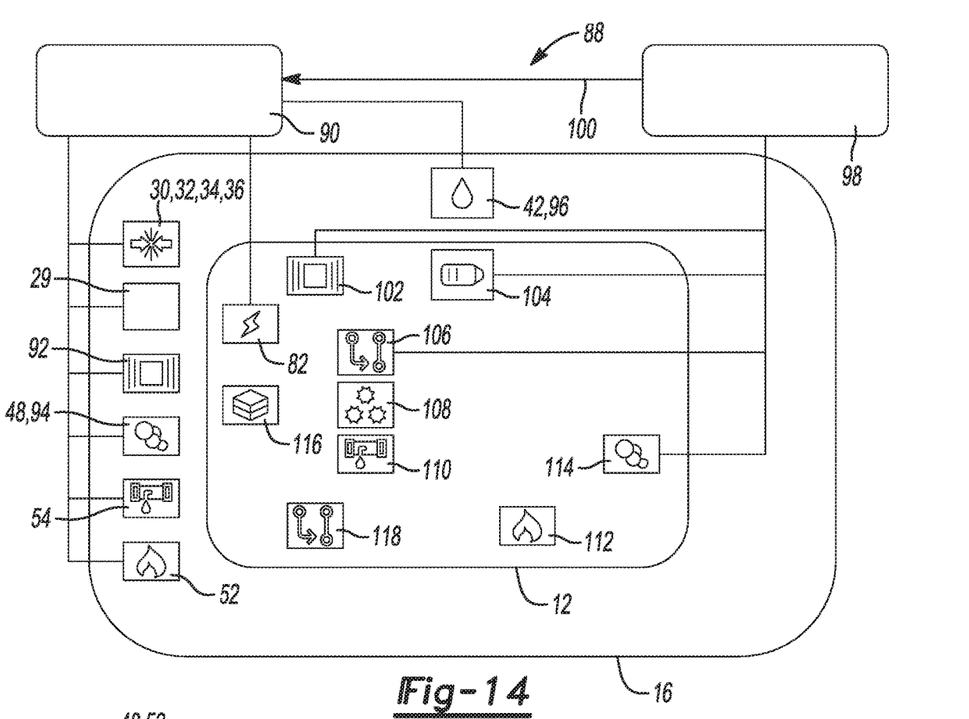
FIG. 14 is a schematic presentation of a battery pack safety system for a battery powered vehicle connected to according to an exemplary embodiment.

The safety module 90 of the vehicle battery safety sensor system 88 is further in communication with a vehicle battery management system (BMS) 98 via a communication bus 100. The BMS 98 receives output signals from its own set of sensors which are associated with the battery pack 12. The BMS 98 sensors include a capsulation defect sensor 102, a self-discharge sensor 104, a short circuit sensor 106, a metallic particle sensor 108, a battery leak sensor 110, a fire sensor 112, a heat sensor 114. The BMS 98 may further include a damage separator 116 and a short-overload detector 118. The BMS 98 is responsible to isolate the battery pack 12 under predetermined conditions which may threaten the integrity of the battery pack 12 or the vehicle 14. The BMS 98 is therefore in continuous communication with the battery pack 12, but does not sense or incorporate signals identifying conditions which impact the frame 16. The communication bus 100 is therefore provided between the BMS 98 and the safety module 90 such that the safety module 90 can receive a status of the battery pack 12 as sensed by the various sensors of the BMS 98 and coordinate conditions of the frame 16 to help identify if conditions affecting the battery pack 12 may be enhanced or caused by a condition of the frame 16.

For example, if a short is identified by the short circuit sensor 106, it would otherwise be unknown if the short is a result of water or fluid in the battery bays, or from damage caused by an impact occurring to the vehicle 14 or directly to the frame 16. A signal or output received from any of the additional sensors provided with the safety module 90 can therefore provide an enhanced capability to isolate a cause of the short, and possibly be applied to mitigate against or delay an automatic shutdown of the battery pack 12. In addition, because the safety module 90 includes additional sensors such as the battery leak methane gas sensor 29, if a signal from the battery leak methane gas sensor 29 is received, such a signal may provide a more rapid indication of a battery leak than the signal received from the battery leak sensor 110, and may also indicate a less immediate threat to the battery pack 12 which can then be tracked over time.

Referring to FIG. 15 and again to FIGS. 11 and 14, the vehicle battery safety sensor system 88 provides direct communication between the BMS 98 and a vehicle body control management (BCM) module 120 similar to the ECU 60 previously discussed. The BCM module 120 communicates via the high speed CAN 66 and the low speed CAN 68 with a centralized processor 122 of the safety module 90 which may further include an EEPROM 124 in communication with the safety module power supply 70. The BMS 98 directly communicates with the BCM module 120 via communication lines 126, 128 such that systems of the vehicle are provided with the status of the battery pack 12 which is monitored by the BMS 98. A memory 130 is provided with the safety module 90. Any signals generated by one of the sensors of the safety module 90 create a code unique to each sensor which is saved in the memory 130 for future reference, for example during a maintenance event.

Figure 16:
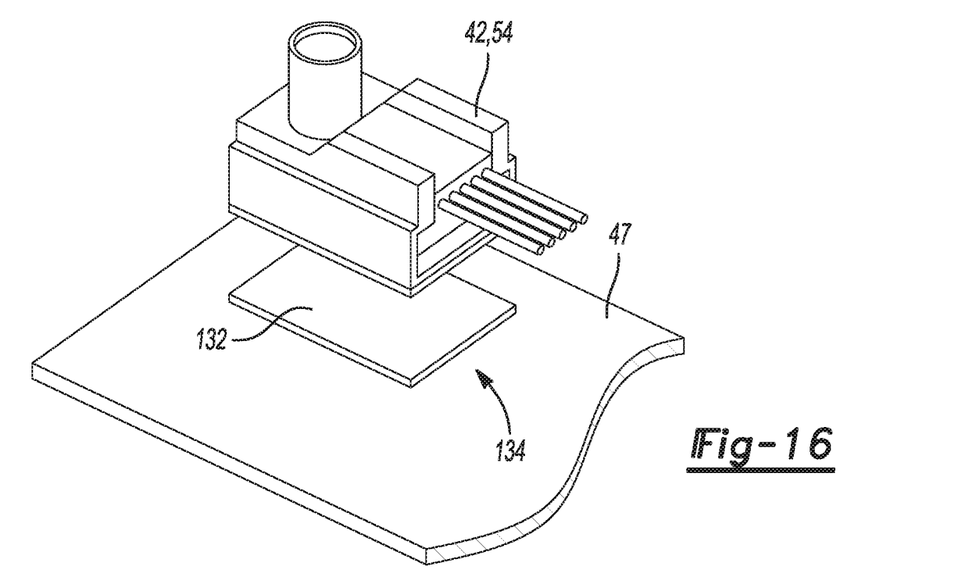
FIG. 16 is a front right perspective view of sensor and a sensor mounting pad prior to installation.
Figure 17:
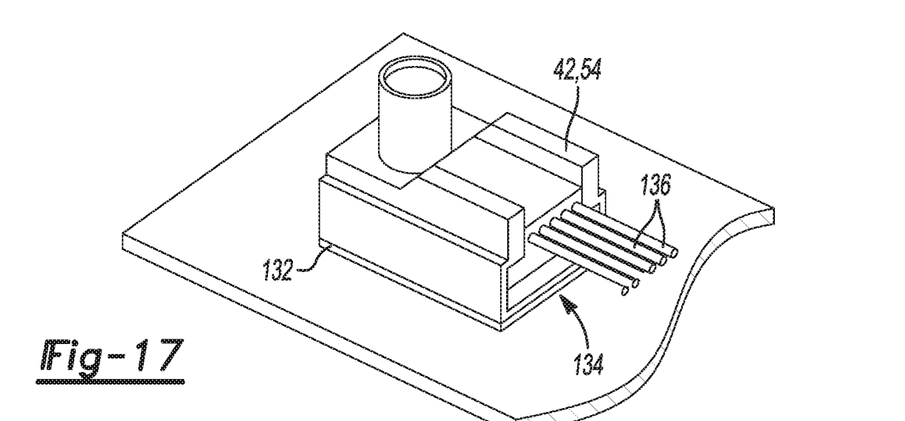
FIG. 17 is a front right perspective view of the sensor and sensor mounting pad of FIG. 16 following installation.

Referring to FIGS. 16 and 17 and again to FIGS. 1 through 7, various ones of the sensors, such as but not limited to the moisture sensors 42 or the battery fluid leak sensors 54 can be attached to the structure or frame 16 by adhesive bonding. In the example presented, which is non-limiting, a first face of a two-sided adhesive pad 128 is adhered to the bottom wall 47 of the frame 16, and one of the sensors is aligned with an opposite face of the two-sided adhesive pad 128. In the attached condition shown in FIG. 17, electrical leads 136 of the sensor are positioned in a predefined orientation determined by the placement orientation of the two-sided adhesive pad 128.

Figure 18:
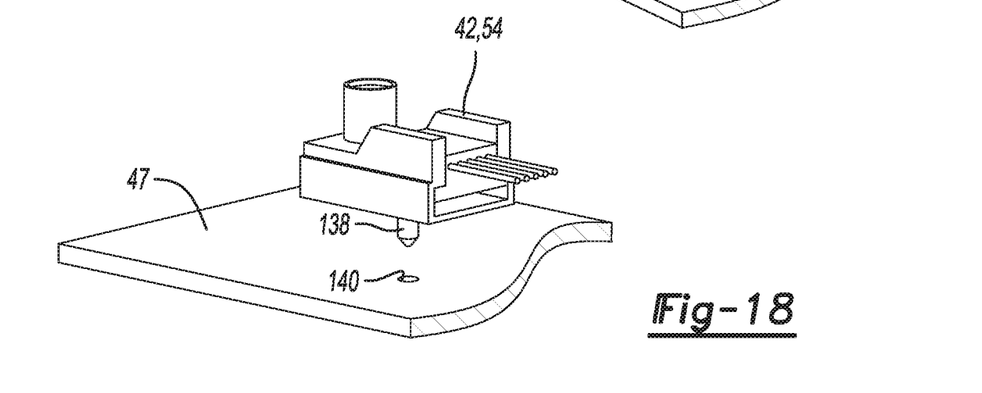
FIG. 18 is a front right perspective view of a sensor having a mounting prong prior to installation.

Referring to FIG. 18 and again to FIGS. 1 through 7 and 16 through 17, an alternative sensor installation method is provided using at least one prong 138 integrally extending from the sensor. The prong 138 is frictionally received in an aperture 140 created in the frame 16, such as in the bottom wall 47 of the frame 16. Two or more prongs 138 can also be provided to resist twisting of the sensor at its contact location on the bottom wall 47.

Figure 15:
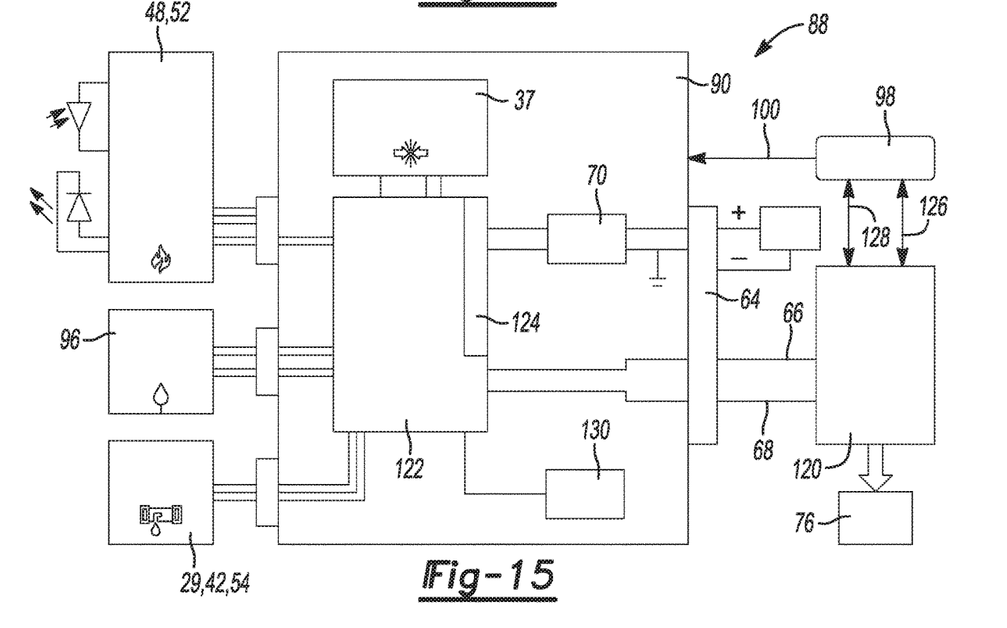
FIG. 15 is a diagrammatic presentation of the battery pack safety system of FIG. 14, further showing connection to a vehicle body control management module.

The battery system for a vehicle 88 includes the battery pack 12 having the structure 16 receiving at least one battery 26. Multiple sensors 29, 30, 32, 34, 36, 37, 42, 48, 52, 54, 92, 94, 96 are mounted to the structure 16 and sense operating conditions inside and outside of the structure 16. The safety module 90 is disposed on the structure 16. The safety module 90 has the centralized sensor processor 122 processing signals received from the multiple sensors to identify if any of the operating conditions defines an abnormal condition of the structure 16. At least one battery pack sensor 102, 104, 106, 108, 110, 112, 114, 116, 118 sense a condition within the battery pack 12 and are in communication with the vehicle battery management system (BMS) 98. The safety module 90 is in communication with the BMS 98 such that the condition within the battery pack 12 is also communicated to the safety module 90. The centralized sensor processor 122 further identifies if the condition within the battery pack 12 correlates with the abnormal condition of the structure 16.

A vehicle battery safety sensor system 10, 88 including a safety module 24, 90 of the present disclosure offers several advantages. These include the provision of multiple different types of sensors directly in or supported on the frame 16 of the battery pack 12, each communicating with the safety module 24, 90 to centrally collect any sensor output signals. The sensors provide indication of the condition of the battery pack 12 both to the vehicle operator such as to a center stack or to a speedometer gage cluster, and to parties passing the vehicle 14 and to a first responder if the vehicle 14 is in an accident or is stranded. The safety module 24 of the present disclosure provides a unified collector for all of the sensor output signals for subsequent communication with the vehicle ECU.

A signal generated by any of the sensors of the present disclosure indicates an "abnormal condition" present within the chamber or bay 38 of the frame 16, or present in the structure defining the frame 16. The abnormal condition can therefore be smoke or gas, fire, a liquid present within the bay 38, structural deformation resulting from strain loading, and the like.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A battery system for a vehicle, comprising:
a battery pack having a structure receiving at least one battery, the at least one battery includes multiple battery cells, and wherein the structure includes multiple cross beams successively defining a plurality of sub-chambers each receiving an individual battery cell of the multiple battery cells;
at least one first sensor mounted to the structure for sensing an operating condition inside or outside of the structure;
a safety module disposed on the structure, the safety module processing signals received from the at least one first sensor to identify if the operating condition defines an abnormal condition; and
at least one second sensor sensing a condition of the battery pack and in communication with a vehicle battery management system (BMS), the safety module in communication with the BMS such that the condition of the battery pack is also communicated to the safety module, the BMS not sensing or incorporating signals identifying conditions which impact the structure,
wherein the structure includes a low point, and the at least one first sensor is disposed at the low point.

2. The battery system for a vehicle of claim 1, wherein the safety module includes a memory at least temporarily saving signal data from the at least one first sensor as a code.

3. The battery system for a vehicle of claim 2, wherein the BMS is in communication with a body control management (BCM) module which isolates the battery pack following indication of the abnormal condition.

4. The battery system for a vehicle of claim 3, wherein the safety module includes a centralized sensor processor receiving signals from the at least one first sensor and in communication with the BMS, the BCM, and the memory.

5. The battery system for a vehicle of claim 1, wherein the at least one first sensor defines a gas sensor.

6. The battery system for a vehicle of claim 5, wherein the gas sensor defines a battery leak methane gas sensor.

7. The battery system for a vehicle of claim 6, wherein the structure includes a surface with the gas sensor positioned on the surface.

8. The battery system for a vehicle of claim 1, wherein the structure includes a surface with the at least one first sensor adhesively connected to the surface.

9. The battery system for a vehicle of claim 1, wherein the structure includes a surface with the at least one first sensor attached to the surface using a prong frictionally received in an aperture created in the surface.

10. The battery system for a vehicle of claim 1, wherein the at least one first sensor defines multiple moisture sensors having one of the multiple moisture sensors mounted in each of the sub-chambers.

11. A battery system for a vehicle, comprising:
a battery pack having a structure, the battery pack having multiple battery cells, and wherein the structure includes multiple cross beams successively defining a plurality of sub-chambers each receiving an individual battery cell of the multiple battery cells;
multiple sensors mounted to the structure and sensing operating conditions inside and outside of the structure;
a safety module disposed on the structure, the safety module having a centralized sensor processor processing signals received from the multiple sensors to identify if any of the operating conditions defines an abnormal condition of the structure; and
at least one battery pack sensor sensing a condition within the battery pack and in communication with a vehicle battery management system (BMS), the safety module in communication with the BMS such that the condition within the battery pack is also communicated to the safety module, the BMS in continuous communication with the battery pack and receiving output signals from a BMS dedicated set of sensors which are in communication with the battery pack, the BMS not sensing or incorporating signals identifying conditions which impact the structure;
wherein the centralized sensor processor further identifies if the condition within the battery pack correlates with the abnormal condition of the structure, and
wherein the structure includes a low point, and the at least one of the multiple sensors disposed at the low point.

12. The battery system for a vehicle of claim 11, wherein:
the structure includes a frame defining a chamber containing the at least one battery; and
at least one of the multiple sensors defines a battery leak methane gas sensor mounted to a surface of the frame.

13. The battery system for a vehicle of claim 11, wherein:
the structure defines a frame having an outer wall defining a chamber containing the at least one battery; and
at least one of the multiple sensors defines an impact sensor mounted to the outer wall.

14. The battery system for a vehicle of claim 11, wherein:
the structure defines a frame having an outer wall defining a chamber containing the at least one battery; and
the safety module is mounted to the outer wall external to the chamber.

15. The battery system for a vehicle of claim 11, wherein the BMS is in communication with a body control management (BCM) module which isolates the battery pack following indication of the abnormal condition.

16. The battery system for a vehicle of claim 15, wherein the safety module includes a memory at least temporarily saving signal data from each of the multiple sensors as sensor codes.

17. The battery system for a vehicle of claim 16, wherein the centralized sensor processor is in direct communication with the BMS, the BCM, and the memory.

18. The battery system for a vehicle of claim 11, further including a communication bus providing communication between the BMS and the safety module, the safety module receiving a status of the battery pack sensed by the dedicated set of sensors of the BMS and coordinating sensed conditions of the structure to identify if conditions affecting the battery pack are influenced by the sensed conditions of the structure.

* * * * *